Dec. 26, 1967   E. N. ROSENBERG   3,359,794
OMNI-DIRECTIONAL CURRENT METER
Filed Feb. 4, 1965
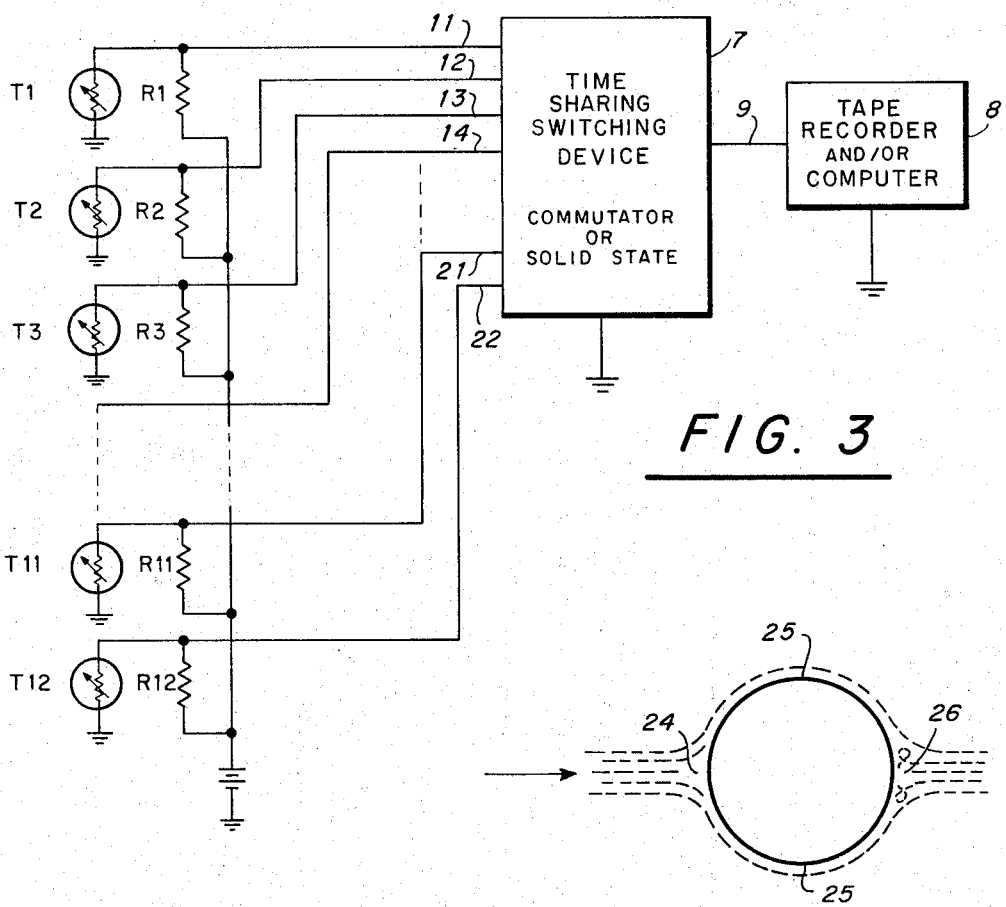
FIG. 3
FIG. 2
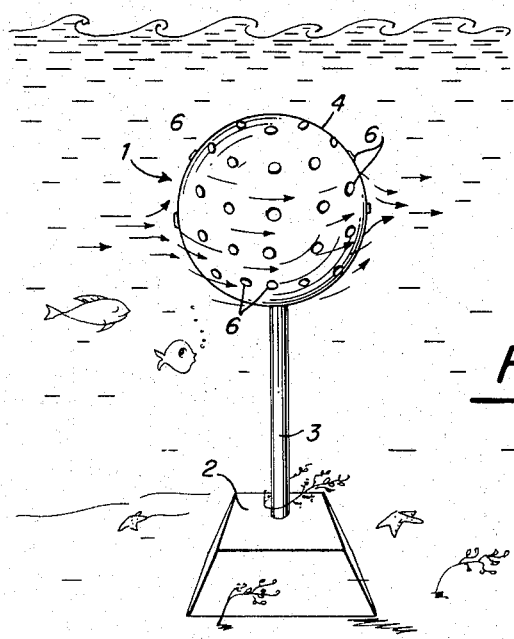
FIG. 1
INVENTOR.
EDGAR N. ROSENBERG
BY
ATTORNEYS United States Patent Office 3,359,794
Patented Dec. 26, 1967

3,359,794
OMNI-DIRECTIONAL CURRENT METER
Edgar N. Rosenberg, 6914 Mission Gorge Road,
San Diego, Calif. 92120
Filed Feb. 4, 1965, Ser. No. 430,504
4 Claims. (Cl. 73—189)

ABSTRACT OF THE DISCLOSURE

A spherical current meter for determining direction and speed of a fluid, the meter having closely and equidistantly spaced thermistor means carried on its surface and recorder means providing continuous information as to the temperature of each of the thermistor means. Fluid flowing past the spherical meter produces increasing temperature readings as the flow follows its arcuate curvature from an initial impact point. Consequently, by employing a computer or similar means, flow direction as well as flow speed can be ascertained.

---

The invention described herein may be manufactured and used by or for the Government of the United States of America for governmental purposes without the payment of any royalties thereon or therefor.

The present invention relates to current meters and, in particular, to meters for determining the direction or the velocity of a flowing liquid.

Although a wide variety of current meters have been developed for use in both air and water, it appears that the majority of these meters are relatively complex structures requiring, for the most part, some moving parts which tend to reduce their reliability as well as provide a need for frequent maintenance or at least frequent inspection.

A further significant consideration is that those meters which have been developed for studying ocean currents are limited in their versatility to the extent that they are capable either of ascertaining current direction or current velocity, but not both direction and velocity. In present day oceanography, it is highly important to have a meter which is sufficiently reliable to be placed and left in a particular location to provide a constant record both of the direction and the velocities of the underwater currents. Such factors are most useful in determining conditions which effect the propagation of sound which, of course, provides information essential to the underwater detection capabilities of sonars.

It is therefore a primary object of the present invention to provide a simple, reliable current meter having the capability of determining both the direction and velocity of liquid flow.

A more specific object is to provide such a current meter which requires no moving parts so as to be essentially maintenance-free and capable of being left in a particular location for a substantial period of time to provide continuous data.

Other objects and attendant advantages will become more apparent in the ensuing description which is to follow.

A preferred embodiment of the invention is illustrated in the accompanying drawings of which:

FIG. 1 is a pictorial representation of the meter mounted in an underwater position;

FIG. 2 is a schematic representation of the meter illustrating particularly certain current flow conditions materially effects the operation of; and FIG. 3 is a schematic electrical diagram of the thermistor circuitry employed by the meter.

Referring to FIG. 1, it will be seen that meter 1 normally is mounted in a fixed position and, although this mounting can assume a variety of forms, it is preferred to employ a weighted base 2 having a shaft 3 on which the meter is securely fixed.

The meter itself may be of extremely simple construction which, as shown, includes principally a spherical body 4 on which are mounted a plurality of equally spaced thermistors 6. The spherical body most suitably is hollow and may be formed of any appropriate material such as metal or plastic, the material primarily being selected for its strength and resistance to salt water corrosion so as to permit the meter to be left on location for long periods of time. The hollow interior of the sphere may be used as space for mounting the necessary electrical circuitry and readout indicators which will be subsequently described. However, if desired, the circuitry can be carried to a surface location and the readout indicator there disposed.

The principal features of the invention relate to the spherical nature of the meter and also to the use of thermistors 6 which, as already stated, are substantially equally spaced over the surface of the sphere. Depending upon the accuracy required, either 12 or 32 thermistors can be employed and, as is known, these thermistors can be of any suitable impedance type in which the resistance varies as a function of temperature change.

The only other components necessary for effective operation include the previously mentioned readout mechanism as well as circuitry for supplying the voltages of each of the thermistors to the readout.

Again, depending upon the accuracy desired, this circuitry and readout can vary widely. FIG. 3 represents a relatively simple circuit arrangement used primarily for purposes of illustration and, as needed, greater accuracy can be provided by utilizing bridge circuits, etc. As shown in FIG. 3, the circuitry includes a time-sharing switching device 7, either of a commutator or solid state type, this switching device being electrically coupled to a tape recorder 8 by a line 9. If desired, a computer can be utilized in lieu of the tape recorder or, as will be appreciated, any appropriate type of readout can be substituted. Switching device 7, which may be of any conventional type, is used to sample the resistance of each thermistor in sequence, the switching preferably being designed to take place in a short time. As seen, each thermistor (T1, T2, T3, etc.) is coupled to switching device 7 by lines 11, 12, etc. Also resistors (R1, R2, R3, etc.) are connected across each thermistor in the illustrated manner so that changes in temperatures of the thermistors are reflected in variations in the voltages across resistors R1, R2, R3, etc. Consequently, the switching is capable of applying the temperature-proportional voltages sequentially to tape recorder 8 so as to provide all of the information essential for determining both the direction of the current flow and its velocity.

The manner in which the meter functions is dependent upon wellknown phenomena which result as a liquid current flows past a spherical body. These phenomena are illustrated in FIG. 2 where it will be noted from the dotted lines that the point where the water approaches the sphere is a stagnation point 24 at which the velocity of the water flow normally would be at its lowest. In contrast, the maximum velocity of the water is at a point 25 or, in other words, at a point where it has traversed halfway around the sphere. Stated in another manner, this maximum velocity flow occurs at all points located on the equator of the sphere. By the same anology, the point of approach or stagnation point 24 may be considered as a north pole, while point 26, where the fluids leave the sphere, is a turbulent area which can be considered as a south pole.

Such being the situation, it will be readily understandable that thermistors located around the equator of the sphere record a lower temperature than all others on the sphere since the velocity of flow is a maximum and, therefore, capable of reducing the temperatures of these thermistors to the greatest extent. In a similar manner, the thermistor located at the north pole would record a relatively high temperature, while other thermistors in the immediate vicinity would record proportionately high temperatures. The thermistors located on the south pole, being in a turbulent area, record a slightly lower temperature than those at the north pole. With a record of the temperature-proportional voltages across resistors R1, R2 and R3, etc., it then becomes a relatively simple matter to construct a plot of the lowest temperature points which, of course, establishes the location of the equator. It then can be seen that the flow is perpendicular to the equator, the actual direction of the flow also being ascertainable by noting the highest temperature, which temperature indicates the vicinity of the north pole of the sphere.

In addition to permitting a determination of current direction, the meter also provides information as to the current velocity. Velocity is determinable by a comparison of the relative temperatures of the thermistors from the north pole to the equator. For example, if there is no flow condition or, in other words, no relative movement of the water past the meter, it is obvious that all thermistors would have the same reading. Thus, as the velocity of the flow increases, greater ranges or excursions of temperatures are recorded. Consequently, by proper calibration, the meter can be used to indicate the speed of the flow.

The advantages of the present meter are quite significant, not only because of the versatility that permits determinations of both direction and magnitude of the current, but also because of the simplicity of the structure which completely avoids any moving parts and which also can be constructed of relatively inexpensive materials and components. Simplicity, as well as expense, are important, since a large number of these meters are required to provide significant data relative to the oceanographic condition.

The meter, as already indicated, can be varied substantially without departing from the basic principles of the present invention which involve primarily the use of a spherical body having equidistantly-spaced thermistors. For example, a device of the type described can be a completely self-contained unit submerged in the ocean and recording temperatures and current velocities over a predetermined time. Preferably, it would be battery-operated and contain its own recording and computing device. Alternatively, leads brought to the surface for continuous monitoring from that location.

Obviously many modifications and variations of the present invention are possible in the light of the above teachings. It is, therefore, to be understood that within the scope of the appended claims the invention may be practical otherwise than as specifically described.

What is claimed is:
1. Metering apparatus for determining the direction and velocity of a relatively flowing fluid, comprising;
   a spherical body member,
   means for supporting said body member in a fixed position immersed in said relatively flowing fluid,
   at least twelve substantially equidistantly-spaced impedance-type temperature sensing means mounted in the skin surface of said body member,
   means for monitoring and indicating the temperatures of each of said sensing means, and
   means to compute directly from the said temperatures the direction and velocity of the following fluid.

2. The apparatus of claim 1 wherein said monitoring and indicating means includes;
   readout means,
   a circuit electrically coupling each of said sensing means to said readout means, and
   switching means disposed in said circuits for sequentially closing each circuit whereby voltages across said impedance-type sensing means are sequentially applied to said readout means,
   said direction of flow being determinable from a relative comparison of all sensing means voltages and the velocity of flow being determinable from the voltage excursions of the individual sensing means.

3. The apparatus of claim 1 wherein said sensing means are thermistors.

4. The apparatus of claim 3, said apparatus including thirty-two substantially-equidistantly-spaced thermistors.

References Cited

UNITED STATES PATENTS

| | | | |
|---|---|---|---|
| 2,492,371 | 12/1949 | Sivian | 73—189 XR |
| 2,736,198 | 2/1956 | Kuhn | 73—180 |
| 2,981,104 | 4/1961 | Auger et al. | 73—189 |
| 3,035,441 | 5/1962 | Aagard | 73—170 |
| 3,161,047 | 12/1964 | Griswold | 73—189 |
| 3,221,556 | 12/1965 | Campbell et al. | 73—362 |

RICHARD C. QUEISSER, *Primary Examiner.*

JAMES J. GILL, *Examiner.*

J. W. MYRACLE, *Assistant Examiner.*